Aug. 6, 1957  F. A. KAMAN  2,801,718
IMPACT CLUTCH MECHANISM
Filed April 5, 1956  3 Sheets-Sheet 1

INVENTOR.
Frank A. Kaman
BY
Davis, Lindsey, Wilken + Noyes
Attys.

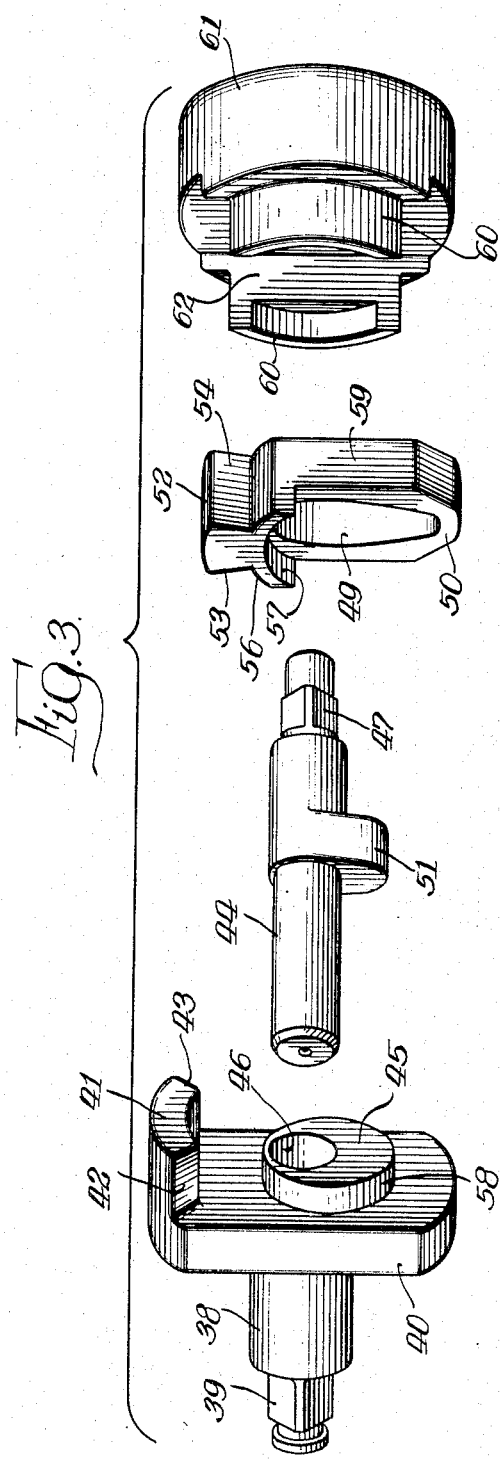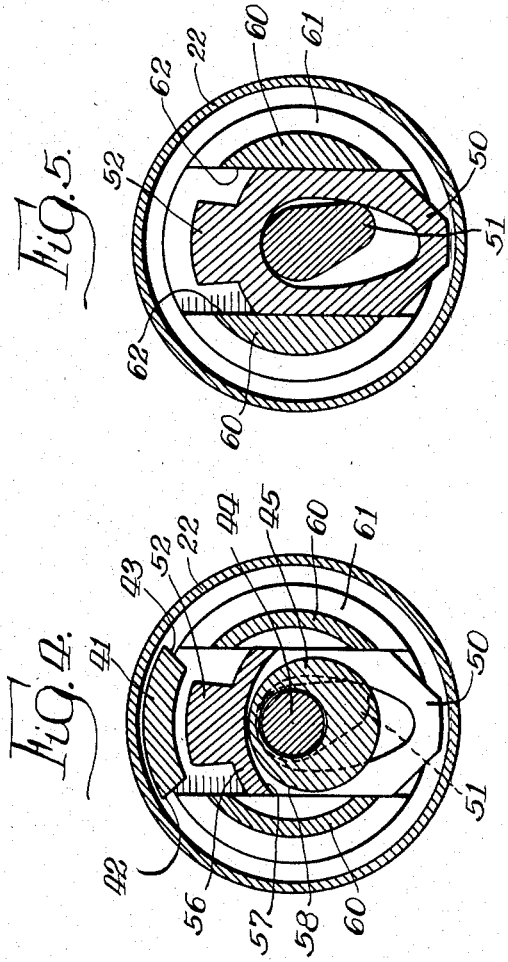

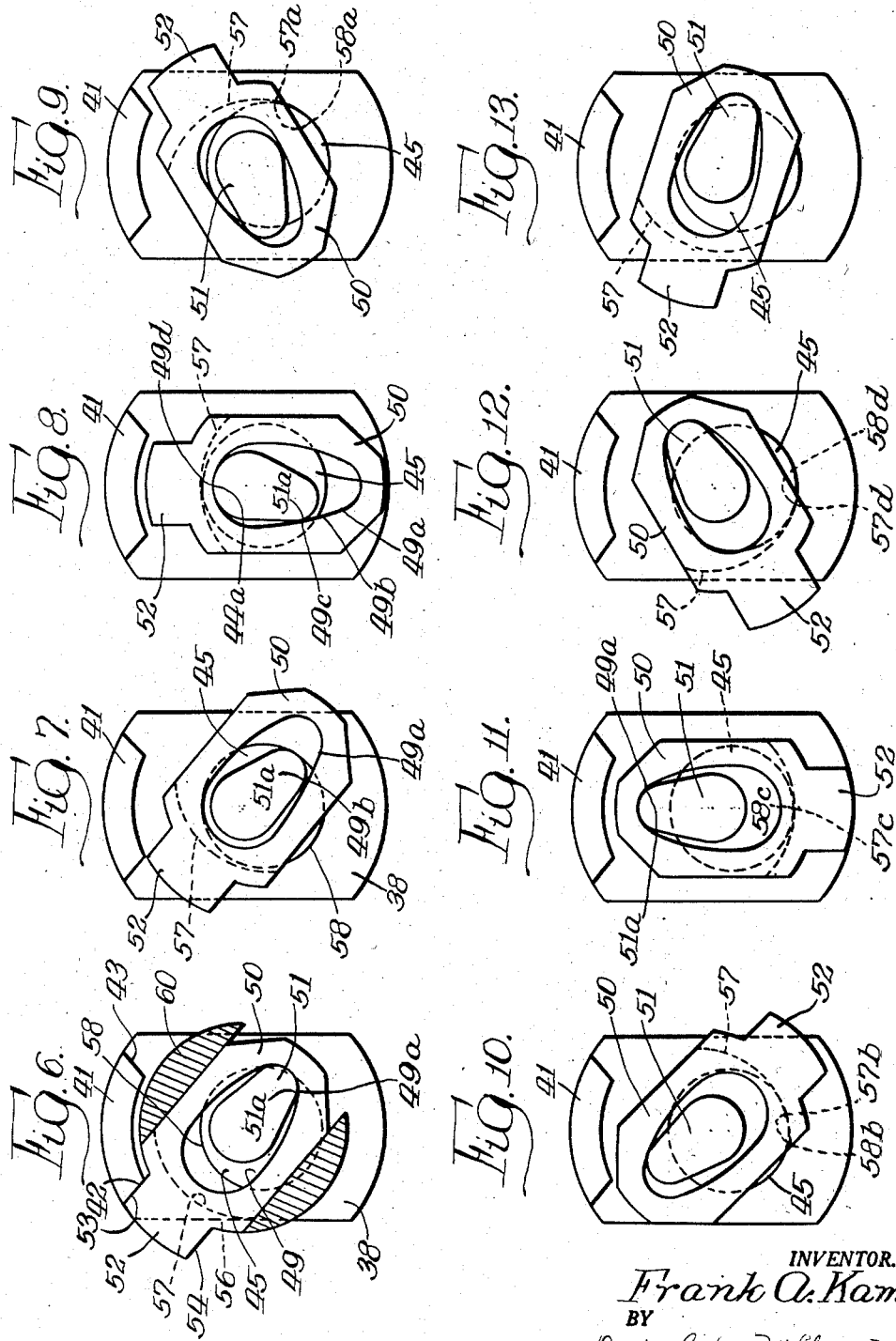

United States Patent Office 2,801,718
Patented Aug. 6, 1957

2,801,718

IMPACT CLUTCH MECHANISM

Frank A. Kaman, Aurora, Ill., assignor to Thor Power Tool Company, Aurora, Ill., a corporation of Delaware Application April 5, 1956, Serial No. 576,477

15 Claims. (Cl. 192—30.5)

This invention relates to improvements in portable power operated impact tools for tightening or loosening nuts or bolts or performing other like operations by power, and more particularly to an impact clutch mechanism operable in both forward and reverse directions and utilized in such impact tools for clutching and declutching the hammer and anvil and for imparting hammer blows in a rotary direction.

One of the principal objects of the present invention is to provide an improved impact clutch mechanism for tools of the foregoing character in which the number of parts of the mechanism have been reduced to the very minimum required and are of simple, rugged and integral construction capable of efficient operation over a long operable life.

Another object of the present invention is to provide an impact clutch unit of the foregoing character having parts of durable construction with relatively thick and strong wall and body portions and possessing no thin walls or web portions and no bearing surfaces of reduced extent.

A further object is to provide an impact clutch of the foregoing character that is of simple and inexpensive construction that may be readily assembled or disassembled by unskilled operators or mechanics for service, lubrication and inspection.

Still another object is to provide an improved impact clutch mechanism in which the impacting clutch member is moved laterally in a rectilinear direction to and from impacting position by a positive cam action, the structure and mode of operation of the cam means being novel in arrangement and possessing great advantages.

Another further object is to provide an improved impact clutch mechanism of the foregoing character having a reduced number of simple parts of durable construction and entirely eliminating the use of springs and their inherent problems and considerations.

A still further object is to provide an improved impact clutch mechanism in which the parts are of rugged, integral or one piece construction and which may be quickly assembled in operable relation without the use of pins, rivets, retaining balls and grooves or other means of connection and assembly which are subject to breakage and deformation.

Other and further object and advantages of the present invention will become apparent hereinafter as the description progresses, reference being had to the accompanying drawings in which:

Fig. 3 is an exploded view of the essential parts of the impact clutch mechanism showing the impact spindle, the drive shaft, the impact clutch member and the hammer cage in perspective;

Fig. 4 is a transverse sectional view taken on the line 4—4 in Fig. 1 looking rearwardly of the tool in the direction of the arrows;

Figure 1:
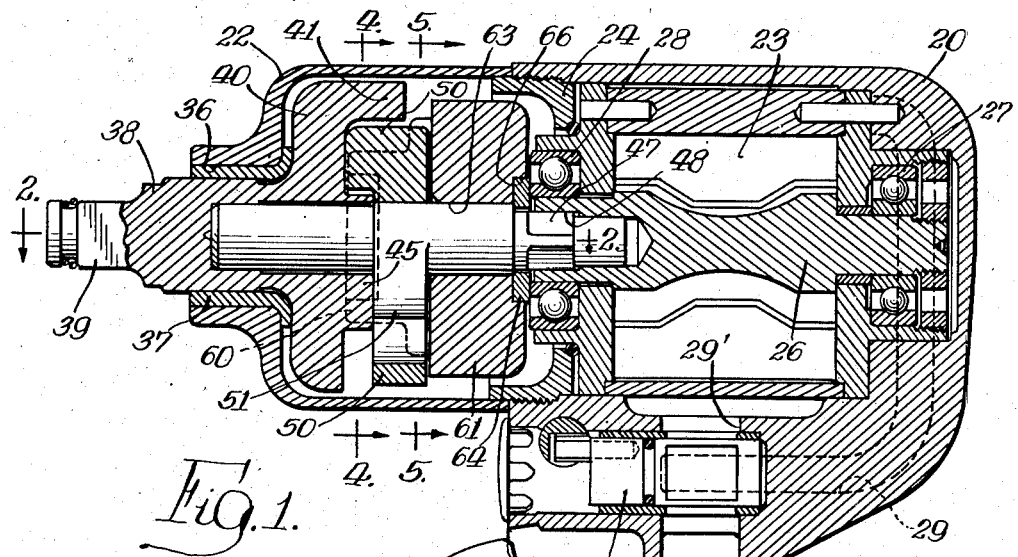
Fig. 1 is a vertical, longitudinal sectional view of an impact tool incorporating an impact clutch mechanism comprising a preferred embodiment of the present invention and showing the impact clutch member in retracted or declutched position.

Fig. 5 is a transverse sectional view taken on the line 5—5 in Fig. 1 looking rearwardly of the tool in the direction of the arrows; and Figs. 6 to 13, inclusive, are elevational views looking forwardly of the tool at certain of the operating parts of the impact mechanism in disassembly from the rest of the tool and illustrating the relative positions of those parts at various stages during the impacting cycle.

Figure 2:
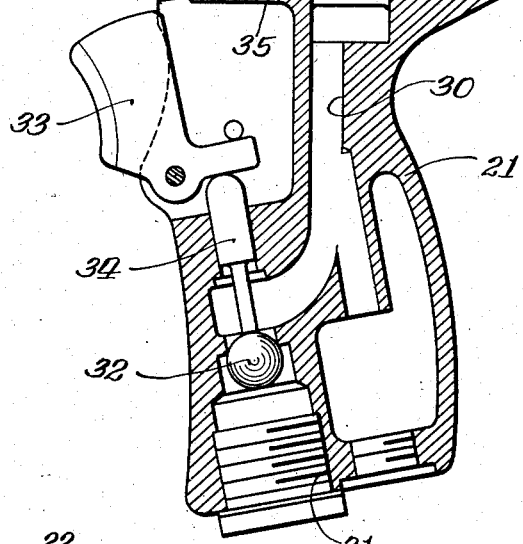
Fig. 2 is a horizontal, longitudinal sectional view of the impact clutch mechanism taken on the line 2—2 in Fig. 1 looking in the direction of the arrows.
Figure 2:
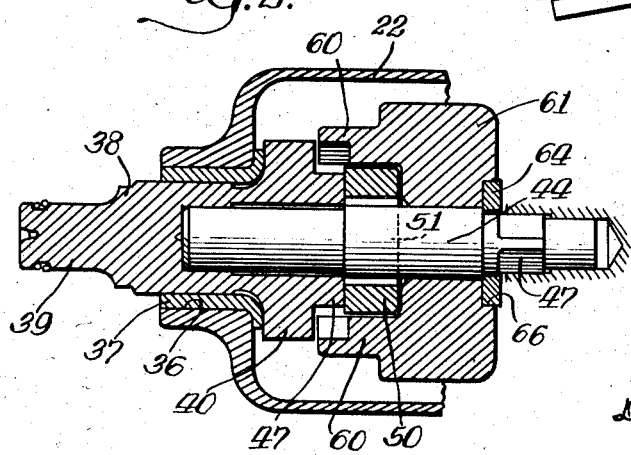

Referring now more specifically to Figs. 1, 2 and 3 of the drawing, the impact tool illustrated therein incorporates an impact clutch mechanism which is a preferred embodiment of the present invention and comprises a rear housing section 20 having an integral handle portion 21 and a forward housing section 22. The front housing 22 encloses the impact clutch mechanism comprising the present invention and is secured to the rear housing which encloses the rotary pneumatic motor 23 by means of a threaded ring 24 carried at the rearward end of the housing 22. The pneumatic motor 23 may be of the usual reversible rotary vane type and has a central motor shaft 26 journaled at its rearward and forward ends in ball bearing units 27 and 28, respectively. For operation of the pneumatic motor 23 air under pressure is admitted to the motor through an air passage 30 in the handle 21. The air passage 30 extends downwardly and connects to a screw threaded air opening 31 in the lower part of the handle 21 through a ball valve 32 which is operated to admit or close off the air supply in the usual manner by a trigger 33 and a plunger 34. From the passage 30, the air passes through a manually operable reversing valve 35 and through one or the other of a pair of passages 29 (only one being shown in Fig. 1) in the housing 20 to the motor 23 for opearting the motor in forward or reverse direction depending upon the position of the valve 35. From the motor 23 the exhaust air passes through an exhaust port 29' and through the valve 35 and is thence discharged through an opening (not shown) in the tool body.

The forward housing 22 is provided with a central opening 36 at its forward end in which is positioned a bushing 37 serving as a bearing member for a rotatable impact spindle or anvil 38 extending therethrough. The outer projecting end of the anvil 38 is in the form of a square 39 to which work engaging members such as sockets (not shown) may be detachably secured. The rearward portion of the anvil 38 within the housing 22 is enlarged as indicated by the reference numeral 40 and this integral enlarged portion 40 has straight parallel sides and its opposite rounded ends extend into close proximity to the inner periphery of the housing 22. An arcuate abutment or impact jaw 41 is integrally formed on the rearward side of the enlarged anvil portion 40 at a point spaced outwardly from the anvil axis and it is axially upstanding or offset from the anvil surface so as to present impacting faces 42 and 43 for forward or reverse operation, respectively. A circular cam 45 is also integrally formed on rearward surface of the anvil 38 and is eccentrically arranged or offset with respect to the anvil axis so as to provide a camming action to be described more fully hereinafter. The cam 45 is offset on that side of the anvil axis that is opposite to the anvil jaw 41.

A drive shaft 44 of the impact unit has its forward end journaled for rotation in a central bore 46 formed in the rearward portion of the anvil 38 and exending through the offset cam 45 and its rearward end is formed with a square 47 received in driving engagement within a square opening 48 in the forward end of the motor shaft 26 by which it is driven. The drive shaft 44 extends through an egg-shaped cam opening 49 of a laterally slidable and rotatable impact clutch member 50 and has a cam lug 51 projecting radially therefrom which is positioned for operation within the egg-shaped cam opening 49 and for camming engagement with the inner cooperating cam faces thereof upon rotation relative thereto. The slidable clutch member 50 is provided at one of its radial ends with a radially projecting integral jaw 52 having impacting faces 53 and 54 adapted to engage and strike the cooperating impact faces 42 and 43, respectively, of the anvil jaw 41 and its forward surface is flat for sliding engagement on the flat rearward surface of the anvil cam 45. An arcuate cam segment 56 is integrally formed on the slidable impact member 50 radially inwardly from and adjacent to the impact jaw 52 and projects axially forwardly so as to provide a curved cam surface 57 adapted to engage during certain points in the cycle of operation the circular cam surface 58 on the offset anvil cam 45 for projecting the impact clutch member 50 into the path of the impact jaw 41, as will be explained more fully hereinafter.

The impact clutch member 50 is also provided with parallel flat surfaces 59 which are received between axially directed and forwardly projecting ears or guide portions 60 of a rotatable cage or hammer 61, the guide portions 60 also being formed with complementary flat surfaces 62 on their inner sides. The impact clutch member 50 is thus guided at all times by the hammer guides 60 for lateral movement in a rectilinear direction as it is cammed into engagement by the offset anvil cam 45 and the cooperating cam element 56 on the impact member 50 and as it is cammed out of engagement by the drive shaft cam 51 and the cam surfaces 49 of the impact member.

The cage or hammer 61 is of relatively great mass to provide an impact blow of great force and is adapted for rotation with and for rotation relative to the anvil 38 depending upon whether or not the impact member 50 is in clutched engagement with the anvil jaw 41. The hammer 61 has a central opening or bore 63 through which the drive shaft 44 extends and the hammer is loosely mounted on the drive shaft 44 to permit rotation of the drive shaft 44 relative to the hammer during certain stages of operation of the impacting unit. A thrust washer 64 encircles the drive shaft 44 and is received within an annular recess 66 in the rearward surface of the hammer 61. The rearward end of the washer 64 projects beyond the rearward end of the hammer 61 and engages the forward ball bearing unit 28. By this latter construction any loads on the end of the anvil square 39 are transmitted directly to the motor bearing unit 28 without binding the slidable impact clutch member 50 and the hammer cage 61 against the rearward face of the cam 45 on the impact spindle 38.

In Figs. 6 to 13, inclusive, of the drawings, there are shown the relative positions assumed in the tightening of a nut or bolt during the various stages of the impacting cycle by the drive shaft com lug 51 and the slidable impact clutch member 50 and its jaw 52 and cam 56 with respect to the anvil 38 and its impact jaw 41 and its circular offset cam 45. In Fig. 6 the guide portions 60 of the hammer cage 61 in which the impact clutch member 50 slides to and from the path of the abutment 41 are shown in section but for clarity in the other views 7 to 13, inclusive, the guide portions have been omitted. It is to be understood that in loosening a piece of work the operation and relative positions of the various symmetrical parts are reversed.

When a nut or a bolt is to be tightened, the operator first places the socket (not shown) secured on the anvil square 39 over a nut or a bolt head and then depresses the trigger 33 to admit air under pressure to the pneumatic motor 23 to operate the same in a forward or tightening direction. The motor shaft 26 drives the drive shaft 44 of the impact unit which in turn rotatably drives the hammer 61 through the shaft cam lug 51 and the slidable impact clutch member 50, all of these parts rotating in a clockwise direction as viewed in Figs. 6 to 13, inclusive.

In Fig. 6, the slidable impact clutch member 50 is shown in full radial projected position with the impact face 53 of its impact jaw 52 in full engagement with the impact face 42 of the anvil jaw or abutment 41 so that the motor torque is transmitted to the anvil 38 to effect rotation of the same and the consequent tightening of a nut or bolt. Fig. 6 shows the position assumed by these parts at the time of impact or when a nut or bolt is being run down to tightened position. At this time or point in the cycle the side cam surface designated by the numeral 51a near the reduced outer extremity of the shaft cam lug 51 engages at point 49a near the reduced end of the internal cam surface 49 of the clutch member 50 to establish a driving contact therebetween. Also as shown in Fig. 6, the arcuate cam surface 57 of the clutch member 50 is out of engagement with the offset anvil cam 45 so that at this point in the cycle these cams are ineffective.

Assuming that a loose nut or bolt is being run down to tightened position, the drive shaft 44 and its cam lug 51, the slidable clutch member 50, hammer cage 61 and the anvil 38 rotate in unison in a clockwise direction as viewed in Fig. 6 and remain in the relative positions shown as long as the nut or bolt is relatively free running. When the nut or bolt approaches tightened position, the resistance of the nut or bolt to rotation increases with the result that the anvil 38 and its jaw 41, he slidable impact clutch member 50 and hammer cage 61 slow down and come to a complete stop since the resistance to rotation is of sufficient magnitude to overcome the transmitted motor torque. However, the drive shaft 44 continues to rotate under motor torque and the driving force applied by the driving shaft cam 51 against the inner cam surface 49 of clutch member 50 cams the impact clutch member 50 radially inwardly to the retracted position shown in Fig. 7 wherein the jaw 52 of the impact clutch member 50 is declutched from and has broken off engagement with the anvil jaw 41. During its retraction, the impact clutch member 50 also slides relative to the cam lug 51 and the point of camming engagement therebetween progresses from point 49a to point 49b which is relatively inwardly along the cam opening 49 as shown in Fig. 7. The clutch member 50 during its retracting movement just described and during its projecting movement to be described hereinafter slides laterally in a rectilinear direction due to the confining influence of the guide portions 60 of the hammer cage 61, these guide portions 60 also serving to prevent relative rotation between the impact clutch member 50 and the hammer cage 61 so as to facilitate the camming action and the consequent retraction and projection of the clutch member 50.

After the impact clutch jaw 52 has been retracted to the Fig. 7 position, the clutch member 50 and the hammer cage 61 are free to rotate relative to the now stationary anvil 38 and its jaw 41 and such rotation will be resumed under the driving torque of the drive shaft 44 through the driving cam lug 51. However, because of the inertia of the relatively great mass of the hammer 61 and the clutch member 50 which must be started into rotation, the camming action between the cam lug 51 and the impact clutch member 50 continues to a further limited extent with the result that the impact clutch member 50 is retracted to the fully retracted position shown in Fig. 8 wherein the point 51a has moved along to the point 49c more centrally disposed along the inner periphery of the cam opening 49 of the clutch member 50. At this point in the cycle of operation, the inner peripheral area 49d at the wider end of the clutch member cam opening 49 is pulled into engagement with the drive shaft 44 at the point 44a and further retraction of the impact clutch member 50 is prevented.

It is to be noted that in the Fig. 8 position of the cycle of operation where the impact clutch member 50 is fully retracted the forward arcuate cam surface 57 of the cam segment 56 of the impact clutch member 50 is still spaced from and out of contact with the cam face 58 of the stationary offset anvil cam 45. However, upon continued rotation of the driving cam lug 51 and the impact clutch member 50 and shortly prior to the stage of the cycle shown in Fig. 9, the leading edge 57a of arcuate cam surface 57 of the impact clutch member 50 engages the surface 58 of the offset anvil cam 45 at a point somewhat removed in a counterclockwise direction from the point of engagement 58a as shown in Fig. 9. When the cam surface 57 engages the offset anvil cam 45, another camming action becomes effective to move the impact clutch member 50 back into projected position and the impact clutch member 50 upon passing the face 43 of the anvil jaw 41 as it rotates clockwise will move rapidly outwardly to its partially projected position of Fig. 9. As the impact clutch member 50 moves outwardly, the contact point 51a on the driving cam 51 also changes its point of camming engagement with the internal cam surface 49 and moves from the 49c point of contact to the 49b point of contact.

During further rotation of the driving cam lug 51 and the clutch member 50, the points of contact between the offset anvil cam surface 58 and the clutch member cam surface 57 progress to points 58b and 57b, respectively, as shown in Fig. 10. Since the distance from the axis of the drive shaft 44 increases progressively from point 58a to point 58b as the clutch cam face 57 moves thereagainst, the clutch member 50 will be forced to slide radially outwardly relative to the hammer guides 60. As shown in Fig. 11 with further rotation of the cam lug 51 and the clutch member 50, the points of contact between the offset cam surface 58 and the clutch cam surface 57 progress to points 57c and 58c on their respective peripheries. Point 58c is located on the offset cam 51 at the greatest radius from the axis of the drive shaft 44 and point 57c is at the mid point in the cam surface 57 and hence at this stage in the cycle the clutch member 50 has reached its fully projected position and is now in the path of the anvil abutment or jaw 41. It is to be noted that the radius of curvature of the cam surface 57 of the impact clutch member 50 is greater than that of the cam surface 58 of the anvil cam 45.

Upon continued rotation of the cam lug 51 and the clutch member 50 beyond the Fig. 11 position to the Fig. 12 position, the arcuate cam surface 57 of the impact clutch member 50 remains in contact with the anvil cam 45 which serves to retain the impact clutch member 50 in fully projected position. As shown in Fig. 12, the arcuate cam surface 57 and the anvil cam engage each other at points 57d and 58d, respectively, point 57d being the trailing edge of the cam segment 57. Thereafter, the cam segment 57 rotates out of engagement with the anvil cam 45.

When the clutch member 50 and the cam lug 51 move beyond the Fig. 13 position to the Fig. 6 position, the clutch jaw 52 coupled with the mass of the hammer 61 strikes the anvil lug 41 a rotary hammer blow and rotates the anvil 38 a limited extent so as to tighten the nut or bolt to a greater degree. Upon completion of impact, the anvil 38, the hammer cage 61 and clutch member 50 are arrested against forward clockwise rotation but the drive shaft 44 and its cam lug 51 continue to rotate under the driving torque of the motor 23 so as to disengage the impact clutch member 50 from the anvil 38. Thereafter, the cycle of operation is repeated as described above with reference to Figs. 6 to 13, inclusive, and the rotary hammer blows may be repeated until the desired degree of tightness of the nut or bolt has been achieved.

It is to be noted with reference to Figs. 9 to 11, inclusive, of the drawing that the point at which the cam surface 51a of the cam lug 51 engages the periphery of the inner cam surface 49 of the clutch member 50 moves progressively toward the reduced or narrower end of the cam opening 49 from the high point at 49c back to the point of contact 49a as shown in Fig. 11. For the remainder of the cycle the point of contact 51a remains substantially at point 49a on the clutch member 50 and the drive is through these points of contact until impact. When the declutching movement occurs, the specific points of contact again change as above described in connection with Figs. 6 to 13, inclusive, and the cycle is again repeated.

The motor torque is transmitted to the impact clutch member 50 and thence to the hammer cage 61 through the cam engagement between the drive shaft cam lug 51 and the clutch member 50 but the nature of this cam engagement which is effective throughout the cycle is one that tends to declutch or retract the clutch member 50 inwardly out of engagement with or out of the path of the anvil jaw 41. However, when the offset cam 45 becomes effective upon its engagement with the cam surface 57 of the clutch member 50, as shown in Fig. 9, another opposing force is exerted on the clutch member 50 and urges it into clutched or projected position. Hence, commencing shortly prior to the Fig. 9 position and lasting until the Fig. 12 position, there are two spaced points of cam contact on the clutch member 50 which progressively change or move along the cam surfaces during the camming action and a declutching force and a clutching force are applied simultaneously to the clutch member 50 in opposition to each other. However, the cam force between the offset cam 45 and the impact clutch member 50 overcomes the declutching force of the driving cam 51 and causes a positive movement of the impact clutch member 50 into projected position in the path of the anvil abutment 41. It must be pointed out, however, that the declutching force tends to hold the arcuate cam surface 57 of the clutch member 50 in sliding engagement against the cam face 58 of the offset cam 45 for positive and regular tool operation from the Fig. 9 to the Fig. 12 positions in the cycle of operation.

During movement of the impact clutch member 50 from declutched position of Fig. 7 to the clutched or impacting position of Fig. 6, centrifugal force is a force that is present in the operation of the tool but it is not considered a prime or an essential factor. As the clutch member 50 moves outwardly from its Fig. 9 position to its fully projected Fig. 11 position, the primary force tending to move the clutch member outwardly is the cam force created by engagement between the clutch member 50 and the offset cam 45. The centrifugal force which is present tends to assist this positive camming force but it is of little moment for proper tool operation in moving the impact clutch member 50 into projected position. No physical movement of the clutch member 50 occurs because of centrifugal force alone and it is the positive camming force of the offset cam 45 against the cam surface 57 which is the essential factor in projecting the clutch member 50 and which without the assistance of centrifugal force is capable of projecting the clutch member in a positive manner.

During the rotary movement of the impact clutch member 50 from its fully projected position of Fig. 11 to the impacting position of Fig. 6, the cam surface 57 of the impact clutch member 50 is out of contact with the offset cam 45 which at this point in the cycle becomes ineffective since it has already served its function of projecting the clutch member to impacting position. Yet the declutching camming force exerted by the driving engagement between the cam lug 51 and the internal cam surface 49 of the impact clutch member 50 is still present but the clutch member 50 still remains in fully projected position due to the inherent friction in the parts and to the centrifugal force which is also present at this stage so that the impact clutch jaw 52 strikes the anvil jaw 41 with a full faced engagement.

Because of the symmetrical construction of the various parts of the impact unit, it is capable of being operated in the reverse direction such as when it is desired to loosen a nut or a bolt. This is accomplished by the operator actuating the reversing valve 35 so as to cause the motor 23 to rotate in a reverse direction in the well known manner. The drive shaft 44, its integral cam lug 51 and the other driven parts will then rotate in a counterclockwise direction, and the face 54 of the impack jaw 52 of the clutch member 50 will engage and strike the face 43 of the impact jaw 41 of the anvil 38. Since the work is in a tightened state initially, the impact clutch member 50 will at the outset of the cycle of operation commence impacting blows against the anvil jaw 41 and such blows will continue until the resistance to rotation offered by the work is less than the driving torque of the cam lug 51 at which point the impacting blows cease and the clutch member 50 will remain in constant, free running engagement with the anvil 38 and all the parts will rotate in unison. The tool may then be allowed to remain in engagement with the work until the work is entirely disengaged from a threaded opening.

The above-described impact wrench is of simple and rugged construction and is capable of a relatively long operable life. Because of the simplicity of construction and the minimum number of parts, its assembly and disassembly for service, lubrication and inspection can be accomplished by relatively inexperienced mechanics and by the tool users themselves. It has no springs, no retaining balls or pins, no complicated fastening means and no other complicated or confusing constructions which frequently present problems in assembly and disassembly. The simplicity of this construction particularly lends itself to low manufacturing costs and because of the very rugged construction with no thin metal sections or webs and no thin bearing edges the tendency to breakage of parts is reduced to a minimum. All the parts are of thick, strong construction as well as being unitary or integral throughout. No joining pins, rivets, screws or welds which are most subject to breakage in impact tools are utilized.

Furthermore, since the declutching of the impact clutch member 50 and its return movement into the path of the anvil abutment 41 is accomplished by a positive camming action, no reliance for such movement and functions need be placed on springs or centrifugal force, which in practical application present varied problems and considerations not only in the inherent design of a tool but in the manufacture thereof as well. The tool is of the free accelerating type under the torque of the air motor and because the impact clutch member 50 is moved laterally rather than axially to clutched position no pumping action of the lubrication and no axial vibration results therefrom. The balancing of the internal forces by the structure of the present invention has consequently resulted in a tool which is pleasant and less fatiguing to operate and in which no one part is placed under undue strains.

It is to be understood that although the preferred embodiment of the present invention has been described above as an impact wrench and has been described with reference to the tightening or loosening of threaded members such as nuts or bolts, the very same tool and impact drive unit by means of special attachments on the anvil square 39 may be adapted for other uses such as a drill, screw driver, tapper, reamer, sander, polisher or wire brush driver. When employed for these latter purposes, the tool will be primarily free runing without operation as an impacting wrench. However, when used as a screw driver or as a drill and the drill or bit becomes frictionally held against free rotation, the impacting features of the present invention will automatically become operable to overcome such excessive friction.

Although there has been described above and illustrated in the drawings a preferred embodiment of the present invention as incorporated in an impact tool, it is apparent that modifications and changes may be made in the details of structure and mode of operation thereof without departing from the spirit and scope of the appended claims.

I claim:

1. An impact clutch comprising a rotatable anvil having an abutment, a rotatable hammer in axial alignment with said anvil and being adapted for rotation with said anvil and for rotation relative to said anvil, an impact member rotatably movable with said hammer and slidable laterally independently of said hammer in a rectilinear direction into and out of the path of said anvil abutment for clutching and declutching said anvil and hammer and for imparting rotational hammer blows on the anvil at said abutment, a driving shaft cam means operable upon rotation of said hammer relative to said anvil for effecting lateral rectilinear movement of said impact member in one direction into the path of said abutment and cam means operable upon rotation of said driving shaft relative to said anvil for effecting lateral rectilinear movement of said impact member in the reverse direction out of the path of said abutment.

2. An impact clutch comprising a rotatable anvil having an abutment, a rotatable hammer in axial alignment with said anvil and being adapted for rotation with said anvil and for rotation relative to said anvil, said hammer having axially extending and spaced guiding portions, an impact member positioned between said guiding portions and rotatably movable with said hammer and slidable laterally independently of said hammer in a rectilinear direction into and out of the path of said anvil abutment for clutching and declutching said anvil and hammer and for imparting rotational hammer blows on the anvil at said abutment, a driving shaft, cam means operable upon rotation of said hammer relative to said anvil for effecting lateral rectilinear movement of said impact member in one direction into the path of said abutment and cam means operable upon rotation of said driving shaft relative to said anvil for effecting lateral rectilinear movement of said impact member in the reverse direction out of the path of said abutment.

3. An impact clutch comprising a rotatable anvil having an abutment, a rotatable hammer in axial alignment with said anvil and being adapted for rotation with said anvil and for rotation relative to said anvil, an impact member rotatably movable with said hammer and slidable laterally independently of said hammer in a rectilinear direction into and out of the path of said anvil abutment for clutching and declutching said anvil and hammer and for imparting rotational hammer blows on the anvil at said abutment, a driving shaft, cam means operable upon rotation of said hammer relative to said anvil for effecting lateral rectilinear movement of said impact member in one direction into the path of said abutment and cam means between the driving shaft and said impact member and operable upon rotation of said driving shaft relative to said anvil for effecting lateral rectilinear movement of said impact member in the reverse direction out of the path of said abutment.

4. An impact clutch comprising a rotatable anvil having an abutment, a rotatable hammer in axial alignment with said anvil and being adapted for rotation with said anvil and for rotation relative to said anvil, an impact member rotatably movable with said hammer and slidable laterally independently of said hammer in a rectilinear direction into and out of the path of said anvil abutment for clutching and declutching said anvil and hammer and for imparting rotational hammer blows on the anvil at said abutment, a driving shaft, cam means between said anvil and said impact member and operable upon rotation of said hammer relative to said anvil for effecting lateral rectilinear movement of said impact member in one direction into the path of said abutment and cam means operable upon rotation of said driving shafts relative to said anvil for effecting lateral rectilinear movement of said impact member in the reverse direction out of the path of said abutment.

5. An impact clutch comprising a rotatable anvil having an abutment, a rotatable hammer in axial alignment with said anvil and being adapted for rotation with said anvil and for rotation relative to said anvil, an impact member rotatably movable with said hammer and slidable laterally independently of said hammer in a rectilinear direction into and out of the path of said anvil abutment for clutching and declutching said anvil and hammer and for imparting rotational hammer blows on the anvil at said abutment, a driving shaft, cam means between said anvil and said impact member and operable upon rotation of said hammer relative to said anvil for effecting lateral rectilinear movement of said impact member in one direction into the path of said abutment and cam means between the driving shaft and said impact member and operable upon rotation of said driving shaft relative to said anvil for effecting lateral rectilinear movement of said impact member in the reverse direction out of the path of said abutment.

6. An impact clutch comprising a rotatable anvil having an abutment, a rotatable hammer in axial alignment with said anvil and being adapted for rotation with said anvil and for rotation relative to said anvil, said hammer having axially extending and spaced guiding portions, an impact member positioned between said guiding portions and rotatably movable with said hammer and slidable laterally independently of said hammer in a rectilinear direction into and out of the path of said anvil abutment for clutching and declutching said anvil and hammer and for imparting rotational hammer blows on the anvil at said abutment, a driving shaft, cam means operable upon rotation of said hammer relative to said anvil for effecting lateral rectilinear movement of said impact member in one direction into the path of said abutment and cam means operable upon rotation of said driving shaft relative to said anvil for effecting lateral rectilinear movement of said impact member in the reverse direction out of the path of said abutment, said hammer guiding portions serving to direct said impact member in a lateral rectilinear direction and to prevent rotation of said impact member relative to the hammer during operation of said camming means.

7. An impact clutch comprising a rotatable anvil having an abutment at its rearward end, a rotatable hammer in axial alignment with said anvil and being adapted for rotation with said anvil and for rotation relative to said anvil, and impact member rotatably movable with said hammer and slidable laterally independently of said hammer in a rectilinear direction into and out of the path of said anvil abutment for clutching and declutching said anvil and hammer and for imparting rotational hammer blows on the anvil at said abutment, a driving shaft, cam means, for effecting lateral rectilinear movement of said impact member in one direction into the path of said abutment comprising a cam element on the rearward end of said anvil and a cooperating cam element on said impact member engageable with anvil cam element during rotation of said hammer and impact member relative to said anvil, and cam means operable upon rotation of said driving shaft relative to said anvil for effecting lateral rectilinear movement of said impact member in the reverse direction out of the path of said abutment.

8. An impact clutch comprising a rotatable anvil having an abutment at its rearward end, a rotatable hammer in axial alignment with said anvil and being adapted for rotation with said anvil and for rotation relative to said anvil, an impact member rotatably movable with said hammer and slidable laterally independently of said hammer in a rectilinear direction into and out of the path of said anvil abutment for clutching and declutching said anvil and hammer and for imparting rotational hammer blows on the anvil at said abutment, a driving shaft, cam means for effecting lateral rectilinear movement of said impact member in one direction into the path of said abutment comprising a substantially circular cam element on the rearward end of said anvil and offset from the axis thereof and a cooperating cam element on the forward side of said impact member engageable with said anvil cam element during rotation of said hammer and impact member relative to said anvil, and cam means operable upon rotation of said driving shaft relative to said anvil for effecting lateral rectilinear movement of said impact member in the reverse direction out of the path of said abutment.

9. An impact clutch comprising a rotatable anvil having an abutment at its rearward end at one side of and radially spaced from the axis of said anvil, a rotatable hammer in axial alignment with said anvil and being adapted for rotation with said anvil and for rotation relative to said anvil, an impact member rotatably movable with said hammer and slidable laterally independently of said hammer in a rectilinear direction into and out of the path of said anvil abutment for clutching and declutching said anvil and hammer and for imparting rotational hammer blows on the anvil at said abutment, a driving shaft, cam means for effecting lateral rectilinear movement of said impact member in one direction into the path of said abutment comprising a substantially circular cam element projecting rearwardly on the rearward end of said anvil and offset from the axis thereof on that side of the axis opposite to said abutment and a cooperating cam element on the forward side of said impact member engageable with said anvil cam element during rotation of said hammer and impact member relative to said anvil, and cam means operable upon rotation of said driving shaft relative to said anvil for effecting lateral rectilinear movement of said impact member in the reverse direction out of the path of said abutment.

10. An impact clutch comprising a rotatable anvil having an abutment at its rearward end at one side of and radially spaced from the axis of said anvil, a rotatable hammer in axial alignment with said anvil and being adapted for rotation with said anvil and for rotation relative to said anvil, an impact member having an impact jaw at one of its ends and rotatably movable with said hammer and slidable laterally independently of said hammer in a rectilinear direction into and out of the path of said anvil abutment for clutching and declutching said anvil and hammer and for imparting rotational hammer blows on the anvil at said abutment, a driving shaft, cam means for effecting lateral rectilinear movement of said impact member in one direction into the path of said abutment comprising a substantially circular cam element projecting rearwardly on the rearward end of said anvil and offset from the axis thereof on that side of the axis opposite to abutment and a cooperating cam element on the forward side of said impact member adjacent the impact jaw thereof engageable with said anvil cam element during rotation of said hammer and impact member relative to said anvil, and cam means operable upon rotation of said driving shaft relative to said anvil for effecting lateral rectilinear movement of said impact member in the reverse direction out of the path of said abutment.

11. An impact clutch comprising a rotatable anvil having an abutment at its rearward end at one side of and radially spaced from the axis of said anvil, a rotatable hammer in axial alignment with said anvil and being adapted for rotation with said anvil and for rotation relative to said anvil, an impact member having an impact jaw at one of its ends and rotatably movable with said hammer and slidable laterally independently of said hammer in a rectilinear direction into and out of the path of said anvil abutment for clutching and declutching said anvil and hammer and for imparting rotational hammer blows on the anvil at said abutment, a driving shaft, cam means for effecting lateral rectilinear movement of said impact member in one direction into the path of said abutment comprising a substantially circular cam element projecting rearwardly on the rearward end of said anvil and offset from the axis thereof on that side of the axis opposite to abutment and a cooperating cam element on the forward side of said impact member adjacent the impact jaw thereof engageable with said anvil cam element during rotation of said hamer and impact member relative to said anvil, and cam means operable upon rotation of said driving shaft relative to said anvil for effecting lateral rectilinear movement of said impact member in the reverse direction out of the path of said abutment, the abutment and the offset cam element being spaced apart on said anvil a distance sufficient to permit the impact jaw and said cooperating cam element on the impact member to pass therebetween upon rotation of said hammer and impact member relative to said anvil.

12. An impact clutch comprising a rotatable anvil having an abutment at its rearward end, a rotatable hammer in axial alignment with said anvil and being adapted for rottion with and for rotation relative to said anvil, an impact member rotatably movable with said hammer and slidable laterally independently of said hammer into and out of the path of said anvil abutment and for clutching and declutching said anvil and hammer and for imparting rotational hammer blows on the anvil at said abutment, said impact member having an opening therein and the wall of said opening providing cam surfaces, a driving shaft extending into said impact member opening, cam means operable upon rotation of said hammer relative to said anvil for effecting lateral rectilinear movement of said impact member in one direction into the path of said abutment, and cam means operable upon rotation of said driving shaft relative to said anvil for effecting lateral rectilinear movement of said impact member in the reverse direction out of the path of said abutment comprising a cam element carried by said driving shaft and positioned within the opening of said impact member for engagement with the cam surfaces thereof.

13. An impact clutch comprising a rotatable anvil having an abutment at its rearward end, a rotatable hammer in axial alignment with said anvil and being adapted for rotation with and for rotation relative to said anvil, an elongated impact member rotatably movable with said hammer and slidable laterally independently of said hammer into and out of the path of said anvil abutment and for clutching and declutching said anvil and hammer and for imparting rotational hammer blows on the anvil at said abutment, said impact member having an elongated opening therein and the wall of said opening providing cam surfaces, a driving shaft extending into said impact member opening, cam means operable upon rotation of said hammer relative to said anvil for effecting lateral rectilinear movement of said impact member in one direction into the path of said abutment, and cam means operable upon rotation of said driving shaft relative to said anvil for effecting lateral rectilinear movement of said impact member in the reverse direction out of the path of said abutment comprising a cam element carried by said driving shaft and projecting laterally therefrom within the opening of said impact member for engagement with the cam surfaces thereof.

14. An impact clutch comprising a rotatable anvil having an abutment at its rearward end, a rotatable hammer in axial alignment with said anvil and being adapted for rotation with and for rotation relative to said anvil, said hammer having axially extending and spaced guiding portions, an impact member positioned between said guiding portions and rotatably movable with said hammer and slidable laterally independently of said hammer into and out of the path of said anvil abutment and for clutching and declutching said anvil and hammer and for imparting rotational hammer blows on the anvil at said abutment, said impact member having an opening therein and the wall of said opening providing cam surfaces, a driving shaft extending into said impact member opening, cam means for effecting lateral rectilinear movement of said impact member in one direction into the path of said abutment comprising a substantially circular cam element on the rearward end of said anvil and offset from the axis thereof and a cooperating cam element on the forward side of said impact member engageable with said anvil cam element during rotation of said hammer and impact member relative to said anvil, and cam means operable upon rotation of said driving shaft relative to said anvil for effecting lateral rectilinear movement of said impact member in the reverse direction out of the path of said abutment comprising a cam member carried by said driving shaft and positioned within the opening of said impact member for engagement with the cam surfaces thereof.

15. An impact clutch comprising a rotatable anvil having an abutment at its rearward end, a rotatable hammer in axial alignment with said anvil and being adapted for rotation with and for rotation relative to said anvil, an impact member rotatably movable with said hammer and slidable laterally independently of said hammer into and out of the path of said anvil abutment and for clutching and declutching said anvil and hammer and for imparting rotational hammer blows on the anvil at said abutment, said impact member having an opening therein and the wall of said opening providing cam surfaces, a driving shaft extending into said impact member opening, cam means for effecting lateral rectilinear movement of said impact member in one direction into the path of said abutment comprising a substantially circular cam element on the rearward end of said anvil and offset from the axis thereof and a cooperating cam element on the forward side of said impact member engageable with said anvil cam element during rotation of said hammer and impact member relative to said anvil, and cam means operable upon rotation of said driving shaft relative to said anvil for effecting lateral rectilinear movement of said impact member in the reverse direction out of the path of said abutment and adapted to move said impact member cam element into cooperating engagement with said offset element comprising a cam member carried by said driving shaft and positioned within the opening of said impact member for engagement with the cam surfaces thereof.

No references cited.